United States Patent
Migitaka et al.

(10) Patent No.: US 7,435,470 B2
(45) Date of Patent: Oct. 14, 2008

(54) INDICATOR PANEL FOR INSTRUMENT AND METHOD OF MANUFACTURING THE SAME

(75) Inventors: Yukinori Migitaka, Kasugai (JP); Teruhiko Iwase, Nagoya (JP); Motoki Takahira, Nukata-gun (JP)

(73) Assignee: DENSO CORPORATION (JP)

(*) Notice: Subject to any disclaimer, the term of this patent is extended or adjusted under 35 U.S.C. 154(b) by 0 days.

(21) Appl. No.: 11/520,808

(22) Filed: Sep. 14, 2006

(65) Prior Publication Data
US 2007/0064322 A1 Mar. 22, 2007

(30) Foreign Application Priority Data
Sep. 14, 2005 (JP) ............... 2005-266469

(51) Int. Cl.
*B41M 5/00* (2006.01)
(52) U.S. Cl. ............ 428/195.1; 428/192; 428/156; 428/162; 428/161; 116/256; 347/1
(58) Field of Classification Search ............ 428/195.1, 428/192, 156, 162, 161; 355/885; 362/29; 116/256; 347/1
See application file for complete search history.

(56) References Cited

U.S. PATENT DOCUMENTS

| | | | | |
|---|---|---|---|---|
| 5,181,745 A | * | 1/1993 | Jacobsen et al. | 283/94 |
| 5,247,429 A | * | 9/1993 | Iwase et al. | 362/29 |
| 5,484,502 A | * | 1/1996 | Bozanic | 156/235 |
| 6,225,369 B1 | * | 5/2001 | Jeon | 522/81 |
| 6,663,252 B1 | * | 12/2003 | Fong et al. | 362/29 |
| 6,856,478 B1 | * | 2/2005 | Miyanishi et al. | 359/885 |
| 6,857,737 B2 | * | 2/2005 | Emslander et al. | 347/105 |
| 6,976,915 B2 | * | 12/2005 | Baker et al. | 463/1 |
| 7,025,453 B2 | * | 4/2006 | Ylitalo et al. | 347/105 |
| 2002/0096064 A1 | * | 7/2002 | Fissell | 101/114 |
| 2005/0031973 A1 | * | 2/2005 | Kobayashi et al. | 430/7 |

FOREIGN PATENT DOCUMENTS

JP 2002-156252 5/2002

\* cited by examiner

*Primary Examiner*—Bruce Hess
*Assistant Examiner*—Tamra L. Dicus
(74) *Attorney, Agent, or Firm*—Nixon & Vanderhye PC

(57) ABSTRACT

An indicator panel for an instrument includes a translucent resin substrate having a first face and a second face opposite to the first face, and a design film on the first face of the substrate. The design film includes a translucent portion through which a light from the second surface of the substrate is transmitted, and an opaque portion which does not transmit the light from the second face of the substrate. The design film is produced by jetting droplets of a UV hardening type colored ink to the first face of the substrate in an inkjet printing, and radiating ultraviolet rays for a time within one second from the jetting so as to harden a mass of the droplets, in which a volume of the droplets is equal to or less than 30 pl.

11 Claims, 3 Drawing Sheets

INDICATOR PANEL FOR INSTRUMENT AND METHOD OF MANUFACTURING THE SAME

CROSS REFERENCE TO RELATED APPLICATION

This application is based on Japanese Patent Application No. 2005-266469 filed on Sep. 14, 2005, the disclosure of which is incorporated herein by reference in its entirety.

BACKGROUND OF THE INVENTION

1. Field of the Invention

The present invention relates to an indicator panel for instrument and a method of manufacturing the same.

2. Description of Related Art

Conventionally, an indicator device, e.g., an instrument panel, is provided in a vehicle. Generally, the indicator device includes a panel and a light source. The panel includes a design portion having scales and letters, and the light source is provided at a backside of the panel. In the panel, the design portion except for the scales and the letters is made of an opaque portion, in which a light is not transmitted. The scales and the letters are made of a translucent portion, in which a light is transmitted. Thereby, the translucent portion, e.g., the scales and the letters, can be displayed clearly by illuminating the panel with the light source at night.

An indicator panel for instrument is usually manufactured by printing the opaque portion (solid concealing image portion) on a surface of a transparent substrate made of resin, e.g., polycarbonate, in a screen-printing. The screen-printing is a printing method, in which ink is printed on a substrate through a screen after an image from a print data is drawn on the screen. The screen-printing has an advantage that a dark opaque portion can be printed at one time.

Further, in the screen-printing, a solvent drying type ink or heat hardening type ink is mainly used. Because the screen-printing is a monochromatic printing, multilayer printings using different color inks are required for forming a multicolored design. In this case, a process number and a process time for the screen-printing are increased. Furthermore, in the screen-printing, a design is restricted because an accuracy of a printing position and a resolution are generally low.

Except for the screen-printing, a digital printing method such as a laser printing, an electrophotography printing, a thermoelectric printing and an inkjet printing is used in other fields, e.g., office automation printer field. These printings can perform a direct printing on the indicator panel for instrument without forming the screen. Thus, these printings may be better for a small lot printing than the screen-printing.

Among the digital printing methods, the inkjet printing rapidly becomes common in the office automation printer field, because the initial cost is low and the resolution is high due to a simple structure. The inkjet printing is performed by jetting ink from a computerized head nozzle.

JP-A-2002-156252 discloses an indicator panel for a display device, in which the panel is formed by the inkjet printing on a transparent substrate made of resin. U.S. Pat. No. 6,856,478 (corresponding to JP-2004-A-286459) discloses an indicator panel, in which an ink receiving layer and a light shielding printed layer are laminated on a substrate by the inkjet printing.

However, when the inkjet printing is performed on a transparent substrate made of resin, e.g., polycarbonate, using the solvent drying type ink, which is conventionally used in the inkjet printing on a paper substrate, the ink does not penetrate the substrate. Therefore, when droplets of the ink are over-printed by an inkjet printing device, the droplets volume left on the substrate may be large. Thus, especially in the overprinting case, a predetermined sharp and clear design cannot be formed due to a transudation of the inks.

SUMMARY OF THE INVENTION

In view of the foregoing and other problems, it is an object of the present invention to provide an indicator panel for instrument having a sharp design film. It is another object to provide a method of manufacturing an indicator panel, in which an ink transudation can be reduced so as to form a sharp design film.

According to a first example of the present invention, an indicator panel for an instrument includes a translucent resin substrate having a first face and a second face opposite to the first face, and a design film on the first face of the substrate. The design film includes a translucent portion through which a light from the second surface of the substrate is transmitted, and an opaque portion which does not transmit the light from the second face of the substrate. The design film is produced by jetting droplets of a UV hardening type colored ink to the first face of the substrate in an inkjet printing, and radiating ultraviolet rays for a time within one second from the jetting so as to harden a mass of the droplets, in which a volume of the droplets is equal to or less than 30 pl.

According to a second example, an indicator panel for an instrument includes a translucent resin substrate having a first face and a second face opposite to the first face, and a design film on the first face of the substrate. The design film includes a translucent portion through which a light from the second surface of the substrate is transmitted, and an opaque portion which does not transmit the light from the second face of the substrate. The translucent portion and the opaque portion are formed by an inkjet printing. The translucent portion has a plurality of translucent sections separated from each other, and the translucent sections have different thicknesses adjusted in accordance with a position relative to a light source that is located at a side of the second face of the substrate. Therefore, the translucent sections have approximately a uniform light transmission density.

According to a third example, a method of manufacturing an indicator panel having a translucent resin substrate and a design film formed on a first face of the substrate includes a printing step and a radiating step. In the printing step, droplets of a UV hardening type colored ink are jetted to the first face of the substrate such that a volume of the droplets is equal to or less than 30 pl. In the radiating step, ultraviolet rays are radiated for a time within one second from the jetting to harden a mass of the droplets so as to form the design film. Thus, the design film has a translucent portion through which a light from a second face of the substrate opposite to the first face is transmitted, and an opaque portion which does not transmit the light.

Accordingly, a sharp design film can be formed in the indicator panel, and an ink transudation can be reduced when the indicator panel is manufactured.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS

First Embodiment

Figure 1:
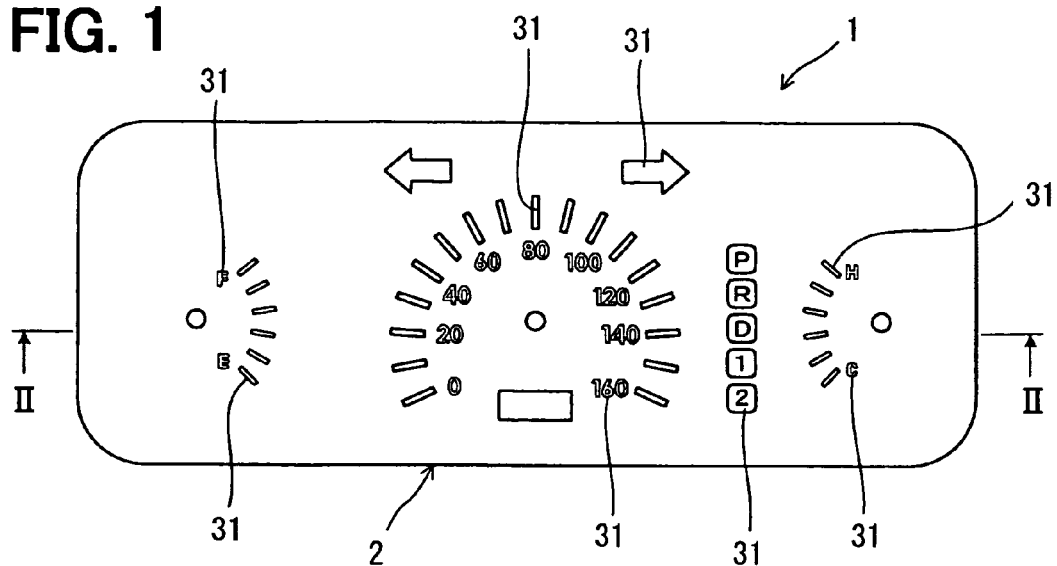
FIG. 1 is a front view of an indicator panel for instrument according to a first embodiment.
Figure 2:
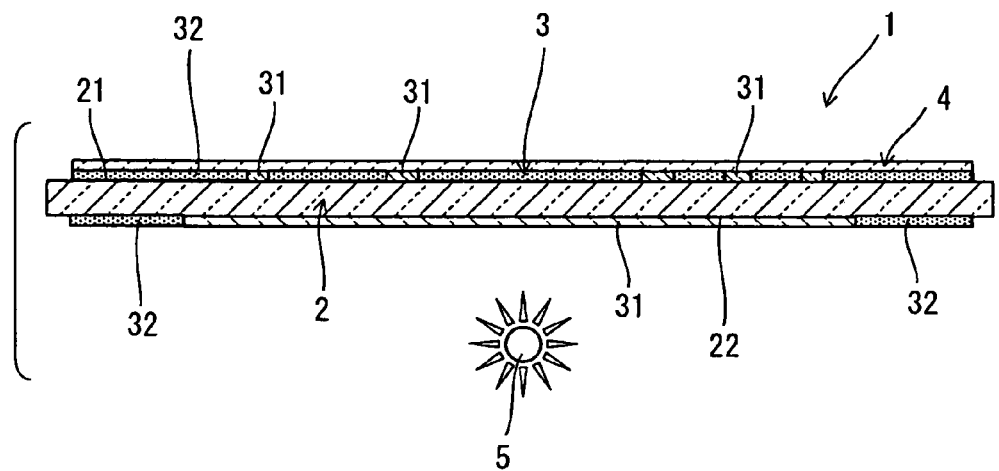
FIG. 2 is a cross-sectional view of the indicator panel taken along line II-II in FIG. 1 according to the first embodiment.

As shown in FIGS. 1 and 2, an indicator panel 1 for instrument is a meter dial for an automobile instrument device (display device) in a first embodiment. The indicator panel 1 includes a translucent resin substrate 2 and a design film 3. The design film 3 is laminated on a design face 21 of the substrate 2, and includes a translucent portion 31 and an opaque portion 32. When a light is illuminated to a back face 22 of the substrate 2 opposite to the design face 21, the light can be transmitted through the translucent portion 31, but not through the opaque portion 32.

Droplets of a UV hardening type colored ink are jetted to the design face 21 by an inkjet printing such that the volume of the ink droplets is equal to or less than 30 pl. Then, the mass of the droplets is hardened by radiating ultraviolet rays within one second from the jetting. Accordingly, the design film 3 can be formed.

As shown in FIG. 2, the automobile instrument device includes the indicator panel 1 and a light source 5, e.g., LED, disposed in the backside of the panel 1. The panel 1 includes the substrate 2 made of a transparent polycarbonate resin and the design film 3 formed on the design face 21 of the substrate 2. The design film 3 includes the translucent portion 31 and the opaque portion 32 in black. A light from the light source 5 can be transmitted through the translucent portion 31, but not through the opaque portion 32.

Further, the panel 1 includes an overcoat layer 4, which covers the design film 3 on the design face 21. The overcoat layer 4 is formed of a transparent matted material in order to lose a luster generated on the design film 3 by an outside light. The overcoat layer 4 can be formed by the inkjet printing using the ink in transparent, which is similar to the forming of the design film 3. Alternatively, the overcoat layer 4 may be formed by a silkscreen printing.

The substrate 2 is formed of a transparent resin, e.g., polycarbonate. The design film 3 includes the opaque portion 32 in black and the translucent portion 31 in a predetermined color. The translucent portion 31 can be colored by suitably mixing the inks. For example, the colors of the inks are clear (transparent), black, white, magenta, cyan, yellow, light cyan and light magenta. An acrylic radical polymerization ink and an epoxy cationic polymerization ink can be used as the UV hardening type colored ink, for example. The opaque portion 32 is formed by using only the black ink, that is, any other colored ink is not used.

Moreover, the design film 3 is also formed on the backside 22 of the substrate 2. A translucent portion 31 on the backside 22 is white. In the indicator panel 1 in the first embodiment, the translucent portion 31 on the design face 21 is illuminated by the light source 5. Thus, the translucent portion 31 on the design face 21 is visible by a driver of the automobile.

Next, a manufacturing method of the indicator panel 1 will be described. The method includes a printing process and an ultraviolet rays radiating process. In the printing process, droplets of the UV hardening type colored ink, the volume of the droplets is equal to or less than 30 pl, are jetted to the design face 21 of the substrate 2 by an inkjet printing. In the ultraviolet rays radiating process, a mass of the droplets is hardened by radiating ultraviolet rays within one second from the jetting of the droplets, so that the design film 3 can be formed. Also, in these processes, the translucent portion 31 and the opaque portion 32 can be formed.

Specifically, a design image shown in FIG. 1 is formed by a computer, and the image is printed on the substrate 2 by the inkjet method using the UV hardening type colored ink. Accordingly, the indicator panel 1 is manufactured.

In the first embodiment, following devices are used for manufacturing the indicator panel 1. For example, an image-processing software made by Adobe Inc. is used for forming the image. For example, an UV hardening type inkjet apparatus (inkjet head, light source for UV radiating simultaneous driving type UJF605C made by MIMAKI Engineering, maximum resolution of 1200 DPI, CMYKKKWW, 8 heads attached) is used as a printing machine.

A light source for radiating ultraviolet rays is mounted beside the inkjet head in the printing machine. After ink droplets are jetted from a head nozzle, ultraviolet rays can be radiated to the droplets.

The indicator panel 1 can be manufactured as described below. Firstly, after an image is formed by a computer, the image data is input from the computer into the printing machine. At this time, a resolution, a droplet volume, a color and a halftone dot rate in each of the ink layers 31, 32 can be specified. Then, the resin substrate 2 is prepared. Droplets of the UV hardening type colored ink are printed by the printing machine at predetermined position where the translucent portion 31 and the opaque portion 32 will be formed, such that the volume of the droplets is equal to or less than 30 pl. The mass of the droplets is hardened by radiating ultraviolet rays within one second from the jetting. Thus, the design film 3 is formed on the design face 21 of the substrate 2. Also, the design film 3 is formed on the backside 22 of the substrate 2 by a similar inkjet apparatus.

Then, the transparent overcoat layer 4 is printed on the design film 3 of the design face 21 by a silkscreen printing. Accordingly, the indicator panel 1 shown in FIGS. 1 and 2 can be manufactured. By placing the indicator panel 1 together with an indicating needle (not shown), a rotating machine (not shown) and the light source 5 into a housing including a casing and a facing board, the automobile instrument device can be manufactured.

According to the first embodiment, the design film 3 can be formed vividly, because the ink is difficult to be transuded. That is, even if the droplets are overprinted, a transudation of the droplets can be reduced, because the design film 3 is formed by using such a small volume of the ink equal to or less than 30 pl. Further, the droplets are hardened in such a short time equal to or less than one second from the jetting. Thus, the ink is difficult to be transuded such that the design film 3 can be formed in sharp. Therefore, the visibility of the design film 3 can be improved and the quality of the design film 3 seems to be high.

Second Embodiment

In a second embodiment, a taper portion 37 is partially formed at a step portion 36 (boundary section) between an opaque portion 32 and a translucent portion 31. An indicator panel 1 is a meter dial similar to that in the first embodiment, as shown in FIG. 1. The indicator panel 1 in the second embodiment may be the same as that in the first embodiment except for providing the taper portion 37. The taper portion 37 will be described by using an arrow in the indicator panel 1 shown in FIG. 1, for example.

Figure 3:
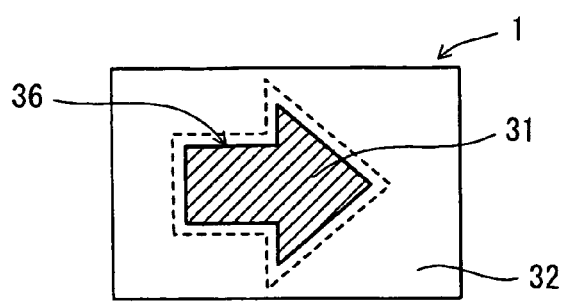
FIG. 3 is an enlarged schematic view showing a part of an indicator panel for instrument according to a second embodiment.
Figure 4:
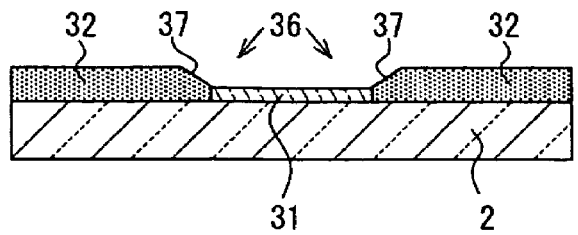
FIG. 4 is a partial cross-sectional view of an indicator panel showing a taper portion at a boundary between a translucent portion and an opaque portion according to the second embodiment.

The arrow in the indicator panel 1 is the translucent portion 31. As shown in FIG. 3, the periphery of the arrow is the opaque portion 32 composed of a UV hardening type colored ink in black, in which a light is not transmitted. At a boundary between the translucent portion 31 and the opaque portion 32, the step portion 36 is formed. As shown in FIG. 4, the thickness of the translucent portion 31 and the thickness of the opaque portion 32 are made different so as to form the step portion 36 therebetween. For example, the thickness of the opaque portion 32 is changed at the step portion 36. In the step portion 36, the taper portion 37 is formed at the end of the thicker one of the portions 31, 32, i.e., the end of the opaque portion 32 in this embodiment. The taper portion 37 tapers to the thinner one of the portions 31, 32, i.e., the translucent portion 31 in this embodiment.

The step between the opaque portion 32 and the translucent portion 31 can be made gradual by forming the taper portion 37. Therefore, when the opaque portion 32 is formed by the inkjet printing, a feathering at the step portion 36 can be reduced such that a sharper design film 3 can be formed.

Figure 5:
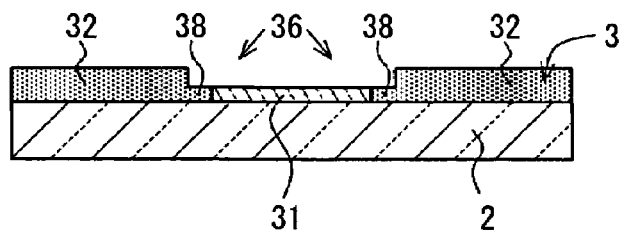
FIG. 5 is a partial cross-sectional view of an indicator panel showing a membrane portion at a boundary between a translucent portion and an opaque portion according to the second embodiment.

As shown in FIG. 5, a membrane portion 38 can be formed at the end of the opaque portion 32 in place of the taper portion 37. That is, in the step portion 36, the membrane portion 38 is formed at the end of the thicker one of the portions 31, 32, i.e., the end of the opaque portion 32 in this embodiment. The thickness of the membrane portion 38 becomes partially thinner than that of the portions 31, 32. The thickness of the membrane portion 38 in the second embodiment is almost as thick as that of the translucent portion 31, as shown in FIG. 5. Thus, the step between the opaque portion 32 and the translucent portion 31 can be made small by forming the membrane portion 38. Therefore, a feathering at the boundary of the opaque portion 32 and the translucent portion 31 can be reduced. Accordingly, the design film 3 can be formed in sharp.

Third Embodiment

Figure 6:
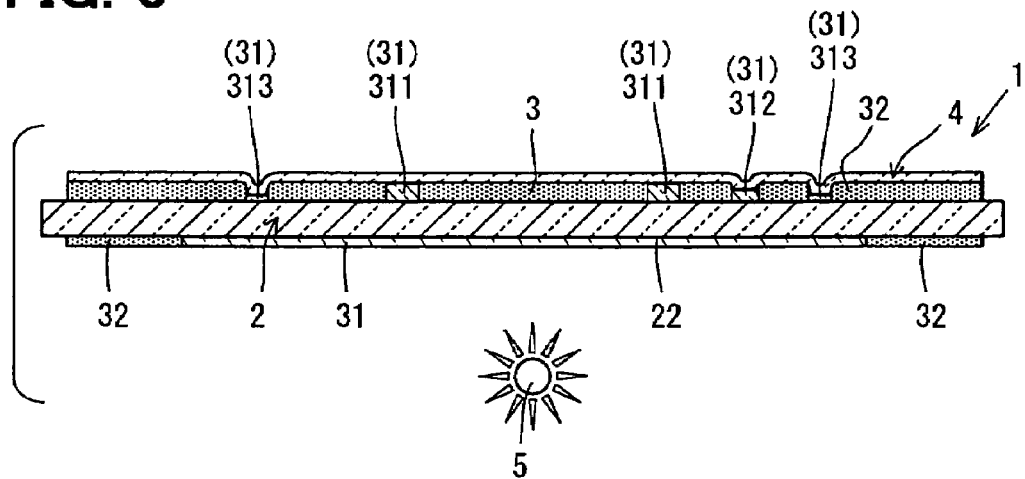
FIG. 6 is a cross-sectional view of an indicator panel for instrument according to a third embodiment.

In a third embodiment, a thickness of a design film 3 is adjusted so that a light transmission density at a translucent portion 31 is approximately uniform. An indicator panel 1 in FIG. 6 is a meter dial similar to that in the first embodiment. The indicator panel 1 in the third embodiment may be the same as that in the first embodiment except for the thickness adjustment of the design film 3.

As shown in FIG. 6, the indicator panel 1 includes a translucent resin substrate 2 and a design film 3. The design film 3 is layered on a design face 21 of the substrate 2, and includes a translucent portion 31 and an opaque portion 32. When a light is illuminated to a back face 22 of the substrate 2 opposite to the design face 21, the light can be transmitted through the translucent portion 31, but not through the opaque portion 32.

An automobile instrument device includes the indicator panel 1 and a light source 5, e.g., LED, disposed in the backside of the panel 1. The thickness of the design film 3 is adjusted so that a light transmission density at the translucent portion 31 is approximately uniform in accordance with the position relative to the light source 5. That is, as shown in FIG. 6, when the distance between the translucent portion 31 and the light source 5 becomes larger, the thickness of the translucent portion 31 is formed to be thinner in the design film 3 on the side opposite to the light source 5. For example, the translucent portion 31 on the side opposite to the light source 5 includes a translucent portion 311 closer to the light source 5, a translucent portion 312 far from the light source 5 than the portion 311, and a translucent portion 313 farthest from the light source 5. The thickness of the translucent portion 311 is thickest since the translucent portion 311 is closest to the light source 5. The thickness of the translucent portion 312 is thinner than that of the portion 311 since the portion 312 is farther from the light source 5 than the portion 311. Moreover, the thickness of the translucent portion 313 is thinnest since the portion 313 is farthest from the light source 5.

The light transmission densities at the translucent portions 311, 312 and 313 can be approximately uniform by adjusting the thickness of the portions 311, 312 and 313 in accordance with the distance of the portions 311, 312 and 313 from the light source 5. Accordingly, a variation in a brightness of the translucent portions 311, 312 and 313 can be reduced when a light is illuminated to the backside 22 from the light source 5.

Modified Embodiments

The above-described embodiments are only examples for the indicator 1. It is to be noted that various changes and modifications will be become apparent to those skilled in the art. For example, the indicator panel 1 in the embodiments may be used as an instrument panel in front of a driver's seat in an automobile, for example. Also, the indicator panel 1 may be used as a display device of an air conditioner.

When the indicator panel 1 includes the translucent resin substrate 2 and the design film 3, the present invention can be suitably used for the indicator panel 1. For example, the design film 3 may be layered on a design face 21 of the substrate 2, and the design film 3 may also be formed on the backside 22 of the substrate 2. The substrate 2 may be formed of any thermoplastic resins, e.g., polycarbonate and polyethylene terephthalate (PET).

The design film 3 can be formed using the UV hardening type colored inks, e.g., clear (transparent), black, white, magenta, cyan, yellow, light cyan, and light magenta. The opaque portion 32 can be formed in a combination of at least two colors, e.g., using magenta, cyan, yellow and black. The inkjet printing can perform a full-color printing or a gradation printing at one time. Therefore, a fine design film 3 can be manufactured by the inkjet printing at a lower cost compared with by a silkscreen printing.

Alternatively, the opaque portion 32 may be formed using only one of the UV hardening type colored ink with a black color. In this case, an ink volume (droplets volume) for the opaque portion 32 can be reduced. When the black ink is jetted, the transudation of the ink can be reduced such that the predetermined image is easily printed. In contrast, when the opaque portion 32 is formed in a combination of colors, the volume of the droplets may be too much. Thus, the sharp design film 3 may be difficult to be formed, since the droplets are easy to be transuded.

Further, the translucent portion 31 may be formed using the clear (transparent) ink. The volume of the ink and the mixing ratio of the ink in the forming material may be adjusted for the translucent portion 31. The thickness of the translucent portion 31 may be set such that a light (visible light) can be transmitted through the translucent portion 31.

In a case in which the volume of the jetted ink is more than 30 pl, the transudation volume of the ink is easy to be large, because the printing is performed with the overlapped droplets.

Figure 7:
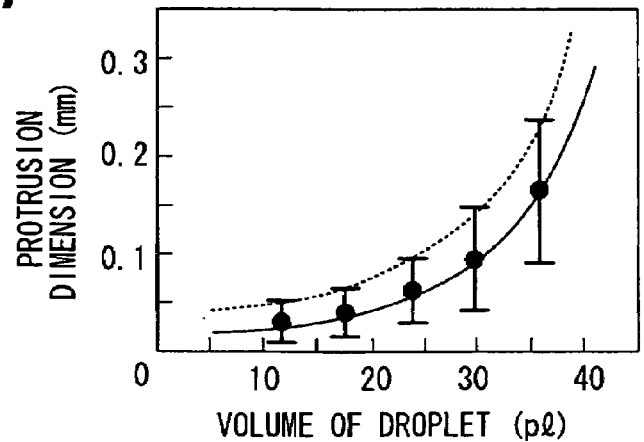
FIG. 7 is a graph showing a relationship between a droplet volume and a protrusion dimension.
Figure 8:
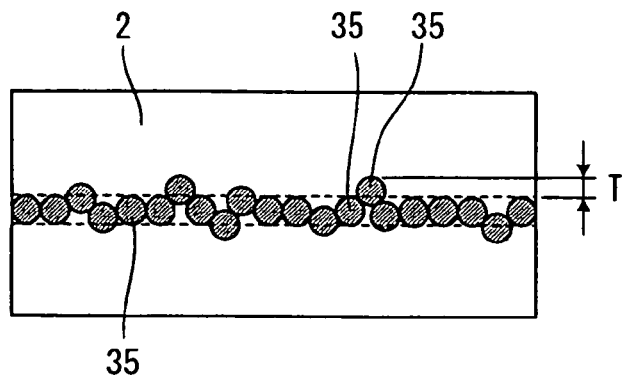
FIG. 8 is a diagram showing a method of measuring the protrusion dimension.

As shown in FIG. 8, when a line is drawn on the substrate 2 by the inkjet printing, a droplet 35 of the ink jetted on the substrate 2 protrudes from the line. The protruded part of the droplet 35 defines a protrusion dimension T. A relationship between the droplet volume and the protrusion dimension T in the inkjet printing is shown in FIG. 7. In FIG. 7, a horizontal axis shows the droplet volume, and the vertical axis shows the protrusion dimension T. As shown in FIG. 7, the protrusion dimension T exponentially increases when the droplet volume increases. When the droplet volume is equal to or less than 30 pl, the protrusion dimension T can be reduced to 0.15 mm or less. Therefore, the droplet volume is set equal to or less than 30 pl. Further, the droplet volume may be set equal to or less than 20 pl. In this case, the protrusion dimension T can be more decreased.

The design film 3 is hardened by the ultraviolet rays for a short time within one second from the jetting of the droplets. When the time from the jetting to the hardening is more than one second, the droplets may be overlapped with each other. Thus, the sharp design film 3 is difficult to be formed due to a feathering of the overlapped droplets.

The design film 3 can be formed by jetting and hardening a monochromatic UV hardening type colored ink. Alternatively, at least two colors of the inks may be partly mixed or contacted. Moreover, the volume of the ink may be controlled by a digital data, such that a thickness, a density and a color of the design film 3 can be continuously changed.

At least a part of the design film 3 may have a layering of a plurality of the design films 3. In this case, a stereoscopic design film can be formed as the design film 3. Therefore, for example, a scale and a letter can be stereoscopic so that a stereoscopic indicator panel 1 can be formed. The stereoscopic design film 3 can be formed by repeatedly forming the design films 3, in which the droplets are jetted and hardened.

When the translucent portion 31 is formed by the layering, the layers except for the top layer can be formed using a transparent ink. In this case, a stereoscopic design film 3 can be formed while keeping the translucent property. In contrast, if the all layers are formed in colored inks, the translucent property may be lowered due to the large thickness of the layering, and the translucent portion 31 may not be displayed clearly, when a light is illuminated to the translucent portion 31.

Figure 9:
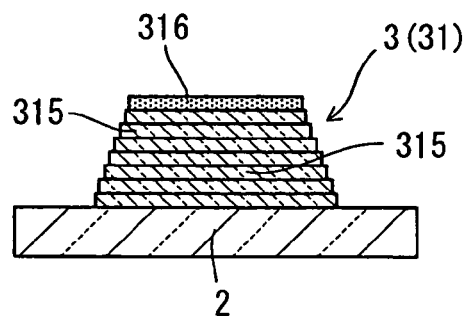
FIG. 9 is a view showing a layering state of plural designed films.

As shown in FIG. 9, for example, after design films 315 made of the transparent ink are layered, a design film 316 made of a desired color is formed as the top layer. Thus, the transparent portion 31 of the stereoscopic design film 3 in the predetermined color can be formed while keeping the translucent property.

As the UV hardening type colored ink, the ink after the hardening can have a stretching rate equal to or more than 5%. When the hardened ink has a stretching rate less than 5%, a contraction by the hardening may be large. Thus, an endurance property of the ink may be worse. The stretching rate of the ink after the hardening can be measured by a measuring method of the stretching rate at break based on Japanese Industrial Standards JISK-7161. Specifically, a dumbbell of the design film, i.e., hardened ink, is tensioned by a tension tester with a speed of 1 mm/min at a room temperature, and a dimension X of the dumbbell is measured, when the dumbbell is broken. The thickness of the dumbbell is 30 μm, and the width of the dumbbell is 5 mm. The stretching rate A can be calculated by the dimension X and an original dimension Y before the test using a following formula.

$$A=(X-Y)*100/Y$$

The design film 3 may have a thickness adjusted in accordance with a position with respect to the light source 5 such that a light transmission density in the translucent portion 31 is approximately uniform.

In this case, a variation in the brightness of the design film 3 can be reduced when the design film 3 is displayed by illuminating a light from the backside. When the design film 3 of the indicator panel 1 is manufactured by the inkjet printing, the thickness of the design film 3 can be partially changed in one printing. The thickness can be controlled in accordance with the position relative to the light source 5. For example, the thickness of the translucent portion 31 positioned adjacent to the light source 5 is increased. In contrast, the thickness of the translucent portion 31 positioned far from the light source 5 is decreased. Thus, the light transmission density at the translucent portion 31 is approximately uniform. Accordingly, the brightness of the translucent portion 31 can be made approximately uniform, when the light is illuminated.

Figure 10:
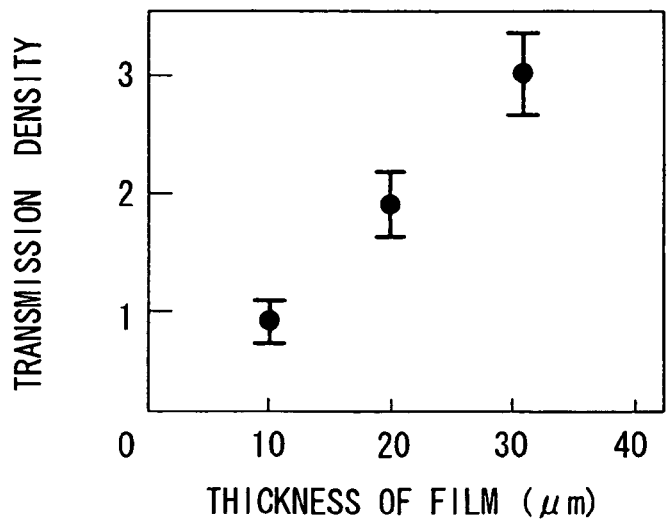
FIG. 10 is a graph showing a relationship between a thickness of a design film and a transmission density.

The light transmission density can be measured at a room temperature using a transmission density meter, e.g., DM-500 manufactured by DAINIPPON Screen MFG. Co., Ltd. The relationship between the transmission density and the thickness of the design film 3 is shown in FIG. 10, when the ink in cyan is used.

The design film 3 may include an overcoat layer 4 on the design face 21, in which the overcoat layer 4 is composed of a transparent ink. In this case, the design film 3 can obtain a matt effect, and an endurance property of the design film 3 can be improved. The overcoat layer 4 may be formed by a silk-screen printing or an inkjet printing, for example.

The design film 3 may have an elastic modulus equal to or less than $10^7$ Pa at a temperature of 100° C. In this case, the design film 3 can obtain a matt effect by a thermal press and a transcription of a demolding film. This is because the design film 3 can be softened by heating to raise the temperature equal to or more than 100° C. such that the elastic modulus of the design film 3 is equal to or less than $10^7$ Pa. In contrast, when the elastic modulus is more than $10^7$ Pa, it is difficult to soften the design film 3 by heating. Therefore, the design film 3 is difficult to have the matt effect.

The elastic modulus of the design film 3 can be determined by measuring a stored elastic modulus when a temperature of an ink film is raised from the room temperature to 150° C. with a temperature raising rate 5° C./min. The measuring is performed with a viscoelasticity measuring instrument using a Dynamic Mechanical Analysis (DMA) method with a strain amount of 0.1% and a frequency of 1 Hz. Here, the ink film used for the measuring is a rectangular shape having a thickness of 30 μm, a length of 40 mm and a width of 2 mm.

Such changes and modifications are to be understood as being within the scope of the present invention as defined by the appended claims.

What is claimed is:

1. An indicator panel for an instrument, the indicator panel comprising:

a translucent resin substrate having a first face and a second face opposite to the first face; and a design film on the first face of the substrate, wherein the design film comprises a translucent portion through which a light from the second surface of the substrate is transmitted, and an opaque portion which does not transmit the light from the second face of the substrate, the design film has a step portion at a boundary between the translucent portion and the opaque portion, at which the translucent portion and the opaque portion have different thicknesses, and the step portion comprises a taper portion at an end edge of a thicker one of the translucent portion and the opaque portion, and the taper portion tapers to a thinner one of the translucent portion and the opaque portion.

2. The indicator panel according to claim 1, wherein:

the opaque portion is made of one black color ink.

3. An indicator panel for an instrument, the indicator panel comprising:

a translucent resin substrate having a first face and a second face opposite to the first face; and a design film on the first face of the substrate, wherein the design film comprises a translucent portion through which a light from the second surface of the substrate is transmitted, and an opaque portion which does not transmit the light from the second face of the substrate;

the design film has a step portion at a boundary between the translucent portion and the opaque portion, at which the translucent portion and the opaque portion have different thicknesses; and the step portion comprises a membrane portion at an end edge of a thicker one of the translucent portion and the opaque portion.

4. The indicator panel according to claim 1, wherein:

the design film has a thickness adjusted in accordance with a position relative to a light source located at side of the second face of the substrate such that a light transmission density in the translucent portion is approximately uniform.

5. The indicator panel according to claim 1, further comprising:

an overcoat layer made of a transparent ink, wherein the overcoat layer is layered on the design film.

6. The indicator panel according to claim 1, wherein:

the design film has an elastic modulus equal to or less than $10^7$ Pa at a temperature of 100° C.

7. An indicator panel for an instrument, the indicator panel comprising:

a translucent resin substrate having a first face and a second face opposite to the first face; and a design film on the first face of the substrate, wherein the design film comprises a translucent portion through which a light from the second surface of the substrate is transmitted, and an opaque portion which does not transmit the light from the second face of the substrate, the translucent portion and the opaque portion are formed by an inkjet printing, the translucent portion has a plurality of translucent sections separated from each other, the translucent sections have different thicknesses adjusted in accordance with a position relative to a light source that is located at a side of the second face of the substrate, the translucent sections have approximately a uniform light transmission density, the design film has a step portion at a boundary between the translucent portion and the opaque portion, at which the translucent portion and the opaque portion have different thicknesses; and the step portion comprises a taper portion at an end edge of a thicker one of the translucent portion and the opaque portion, and the taper portion tapers to a thinner one of the translucent portion and the opaque portion.

8. An indicator panel for an instrument, the indicator panel comprising:

a translucent resin substrate having a first face and a second face opposite to the first face; and a design film on the first face of the substrate, wherein the design film includes comprises a translucent portion through which a light from the second surface of the substrate is transmitted, and an opaque portion which does not transmit the light from the second face of the substrate;

the translucent portion and the opaque portion are formed by an inkjet printing;

the translucent portion has a plurality of translucent sections separated from each other, the translucent sections have different thicknesses adjusted in accordance with a position relative to a light source that is located at a side of the second face of the substrate;

the translucent sections have approximately a uniform light transmission density;

the design film has a step portion at a boundary between the translucent portion and the opaque portion, at which the translucent portion and the opaque portion have different thicknesses; and the step portion comprises a membrane portion at an end edge of a thicker one of the translucent portion and the opaque portion.

9. The indicator panel according to claim 7, further comprising: an overcoat layer made of a transparent ink, wherein the overcoat layer is layered on the design film.

10. The indicator panel according to claim 3, further comprising:

an overcoat layer made of a transparent ink, wherein the overcoat layer is layered on the design film.

11. The indicator panel according to claim 8, further comprising: an overcoat layer made of a transparent ink, wherein the overcoat layer is layered on the design film.

* * * * *